United States Patent [19]

Ikeda et al.

[11] Patent Number: 5,055,522

[45] Date of Patent: Oct. 8, 1991

[54] POLYVINYL CHLORIDE RESIN COMPOSITION

[75] Inventors: Takenori Ikeda, Ichihara; Mitsuru Ohtsubo, Kisarazu; Shunji Arimoto, Narashino; Noboru Okoshi, Sodegaura, all of Japan

[73] Assignee: Dainippon Ink and Chemicals, Inc., Tokyo, Japan

[21] Appl. No.: 451,858

[22] Filed: Dec. 18, 1989

[30] Foreign Application Priority Data

Dec. 16, 1988 [JP] Japan .................................. 63-316349

[51] Int. Cl.$^5$ .............................................. C08L 27/06
[52] U.S. Cl. ..................................... 525/124; 525/123
[58] Field of Search ........................................ 525/124

[56] References Cited

U.S. PATENT DOCUMENTS 4,722,969  2/1988  Tran et al. ........................ 525/123

FOREIGN PATENT DOCUMENTS 61-120820  6/1986  Japan ................................. 525/131
62-53975   3/1987  Japan .

*Primary Examiner*—Ana L. Carrillo
*Attorney, Agent, or Firm*—Armstrong, Nikaido, Marmelstein, Kubovcik & Murray

[57] ABSTRACT

A polyvinyl chloride resin composition is disclosed, which comprises (a) a vinyl chloride homo- or copolymer, (B) a plasticizer, (C) a blocked urethane prepolymer as essential components, the blocked urethane prepolymer (C) being a prepolymer of isocyanurate type polyisocyanate prepared from an alkylene diisocyanate which may contain in the alkylene chain thereof a substituted or unsubstituted cyclohexane or aromatic ring.

13 Claims, No Drawings

POLYVINYL CHLORIDE RESIN COMPOSITION

BACKGROUND OF THE INVENTION

The present invention relates to polyvinyl chloride resin composition having good adhesion strength to substrates as well as excellent corrosion resistance, stability and discoloring resistance. More particularly, the present invention relates to polyvinyl chloride plastisol composition, in particular polyvinyl chloride resin composition which is suitable for plastisol useful as paints and sealing agents.

Polyvinyl chloride resin composition, which has excellent corrosion resistance and weatherability and exhibits excellent characteristics as a resin for coating, has itself rather poor adhesion strength to various kinds of substrates. For this reason, attempts have been made to improve the Polyvinyl chloride resin composition by adding other resins. As the other resins to be added, there have been known, for example, (1) polyamide resins,
(2) liquid epoxy resins and polyamide resins,
(3) blocked urethane prepolymer obtained by using a blocking agent composed of urethane prepolymer having isocyanate group from a polyol and an organic diisocyanate, and mono- or polyamide compound having active amino group (Japanese Patent Publication (Kokoku) No. 59-52901), (4) lactam-blocked polyisocyanate and polyamide compound having active amino group (Japanese Patent Publication (Kokai) No. 59-131669), and
(5) a long chain alkyl-phenol-blocked organic diisocyanate polymer (isocyanurate type polyisocyanate) (Japanese Patent Publication (Kokai) No. 62-41278), or oxobenzoic acid ester-blocked organic diisocyanate polymer (isocyanurate type polyisocyanate).

However, addition of these compounds is not sufficient as described below.

That is, addition of the polyamide resins referred to in (1) above is disadvantageous because although adhesion strength increases thereby, there result decrease in the corrosion resistance inclusive of water resistance and solvent resistance due to the presence of amino groups which are active and susceptible to hydration, deterioration of discoloration resistance since the resin composition changes its color into yellow when heated, and decrease in stability.

When the epoxy resin and polyamide resin described in (2) above are added, both of them are highly reactive at room temperature, and they are unstable, and therefore operation tends to be difficult. In addition, discoloration resistance is insufficient although it is improved much more than the case where the compounds in (1) above are added.

When the blocked urethane prepolymer obtained from the polyol and the organic diisocyanate, and the mono- or polyamide compound having active amino group described in (3) above are added, the resin composition is susceptible to the properties of the polyol, one of the essential component of the prepolymer, resulting in that the corrosion resistance including water resistance decreases, and the molecular weight of the resin increases for small amount of effective NCO (NCO%) generated upon heating, which causes problem of instability of the resin composition at high ambient temperatures in summer. Discoloration resistance is also insufficient like the addition of the compounds mentioned of in (2) above.

In the case where the lactam-blocked polyisocyanate and polyamide compound described in (4) above are added, the compatibility is poor because the characteristics of diisocyanate influence strongly on the property of the resin composition, and strong polarity of lactam and presence of large atomic group elevate the dissociation temperature. Therefore, the resin composition suffers poor performance in addition to poor stability due to poor compatibility. Discoloration resistance is also insufficient like the addition of the compounds (2) above.

Although sufficient stability is given by the addition of the long chain alkyl-phenol- or oxobenzoic acid esterblocked diisocyanate polymer described in (5) above to the polyvinyl chloride resin as adhesiveness imparting agent, the dissociation temperature of the resin composition increases due to the presence of phenolic blocking agent and thus it is difficult to bake the resin by heating under the conditions of low temperatures and short period of time (for example, on the order of 120° C. for 30 minutes), and adhesion of the resin is poor. Furthermore, corrosion resistance inclusive of water resistance as well as solvent resistance are poor because no crosslinking agent is used.

Recently, there has been an increasing tendency that coating materials containing polyvinyl chloride sol composition are used in the form of thin films and the thickness thereof become smaller, and accordingly much importance is attached to corrosion resistance and adhesion strength. Discoloration resistance is also considered important. It is therefore very important to balance the above-described three characteristics and stability which are inconsistent to each other. However, conventional techniques are insufficient to cope with the problem.

SUMMARY OF THE INVENTION

In order to solve the above problem, the present inventors have made intensive investigation. As the result, they have found that when preparing polyvinyl chloride resin composition comprising as essential components (A) a vinyl chloride homo- or copolymer, (B) a plasticizer, and (C) a blocked urethane prepolymer, use of a prepolymer of isocyanurate type polyisocyanate prepared from an alkylene diisocyanate which may contain in the alkylene chain thereof a substituted or unsubstituted cyclohexane or aromatic ring as the blocked urethane prepolymer (C) gives rise to polyvinyl chloride resin composition which has not only excellent adhesion strength to various substrates but also satisfactory corrosion resistance, solvent resistance and discoloration resistance, and which surprisingly has also excellent stability. The present invention is based on this discovery.

Therefore, the present invention provides a polyvinyl chloride resin composition comprising, as essential components, (A) a vinyl chloride homo- or copolymer,
(B) a plasticizer, and
(C) a blocked isocyanate prepolymer wherein said blocked urethane prepolymer (C) is a prepolymer of isocyanurate type polyisocyanate prepared from an alkylene diisocyanate which may contain in the alkylene chain thereof a substituted or unsubstituted cyclohexane or aromatic ring.

The polyvinyl chloride resin composition of the present invention can form a coating film which is excellent in storage stability for a long period of time and also in adhesion strength to various substrates as well as in discoloration resistance. Therefore, the resin composition of the present invention is useful particularly for preparing coating materials and sealing agents.

DETAILED DESCRIPTION OF THE INVENTION

Firstly, the components which constitute the polyvinyl chloride resin composition of the present invention will be explained below.

The vinyl chloride polymer (A) is homo- and/or copolymer of vinyl chloride. Any type of conventional ones can be used.

As for the vinyl chloride copolymer, there can be cited, for example, chlorinated polyethylene and vinyl chloride/vinylidene chloride copolymer as well as copolymers of vinyl chloride with one or more other vinyl monomers copolymerizable therewith (e.g., vinyl acetate, maleic anhydride or its esters, vinyl ether, and the like) Degree of polymerization of the vinyl chloride homo- or copolymer is usually in the range of from 700 to 4,000, and preferably from 1,000 to 2,000. Commercially available products of vinyl chloride homo- or copolymer include "KANE VINYL PSL-10", "KANE VINYL PSH-10", "KANE VINYL PSM-30" and "KANE VINYL PCH-12", each produced by KANEGAFUCHI CHEMICAL INDUSTRY CO., LTD., "Geon 121" and "Geon 135J", each produced by NIPPON ZEON CO., LTD., "Denka Vinyl PA-100" and "Denka Vinyl ME-100", each produced by DENKI KAGAKU KOGYO KABUSHIKI KAISHA, and "Monsanto 70BK" produced by MITSUBISHI KASEI VINYL CO. These can be used alone or one or more of them can be used in the form of a mixture.

The plasticizer (B) which can be used in the present invention may be any conventional one that is generally used for this purpose. Examples of the plasticizer include ester-type plasticizers, particularly phthalic acid esters such as diethyl phthalate, dibutyl phthalate, dioctyl phthalate, dilauryl phthalate, distearyl phthalate, diisononyl phthalate, diisodecyl phthalate, and butylbenzyl phthalate; adipic acid esters such as dioctyl adipate; sebacic acid esters such as dioctyl sebacate; phosphoric acid esters such as tricresyl phosphate, and the like, and mixtures of two or more of them.

Of these, preferred are phthalic acid esters, particularly dioctyl phthalate and diisononyl phthalate.

The blocked isocyanate prepolymer (C) which is used together with the vinyl chloride polymer (A), and the plasticizer (B) is a prepolymer of isocyanurate type polyisocyanate prepared from an alkylene diisocyanate which may contain in the alkylene chain thereof a substituted or unsubstituted cyclohexane or aromatic ring, particularly a prepolymer of isocyanurate type polyisocyanate prepared from such specified ring-containing alkylene diisocyanate, usually alkylene diisocyanate, cycloalkylene diisocyanate and/or aralkylene diisocyanate. The prepolymer is reacted with an active hydrogen-containing compound which has one or two active hydrogen atoms per molecule which can react with the isocyanate groups in the isocyanurate type polyisocyanate, and then blocked.

Examples of typical diisocyanate compounds which can be used for the preparation of the polyisocyanate include aliphatic diisocyanates such as ethylene diisocyanate, 1,4-tetramethylene diisocyanate, 1,5-pentamethylene diisocyanate, 1,6-hexamethylene diisocyanate, trimethylhexamethylene diisocyanate, dodecamethylene diisocyanate, and 1,2-propylene diisocyanate; alicyclic diisocyanates such as cyclobutene-1,3-diisocyanate, cyclohexane diisocyanate, hydrogenated xylylene diisocyanate, 1-methyl-2,4-diisocyanato-cyclohexane, methyl-2,6-diisocyanatocyclohexane, and 3-isocyanatomethyl-3,5,5-trimethylcyclohexyl isocyanate; aryl-aliphatic diisocyanates such as xylylene diisocyanate, and $\omega$-$\omega'$-diisocyanato-1,4-diethylbenzene, and tetramethylxylylene diisocyanate. Furthermore, other diisocyanates which do not belong to the above-listed categories, for example, dimeric acid diisocyanate and lysine diisocyanate can also be used.

Particularly representative examples of the polyisocyanate are those obtained by reacting a diisocyanate compound selected from the group consisting of alkylene diisocyanate, cycloalkylene diisocyanate and aralkylene diisocyanate with each other in the presence of an isocyanurating agent such as one disclosed in Japanese Patent Publication (Kokai) No. 60-181114, e.g., a quaternary ammonium salt such as choline or choline derivative, metal carboxylate such as sodium or potassium carboxylate, or metal alkoxide such as sodium alkoxide. That is, oligomers or polymers such as trimers, pentamers, heptamers, etc. of the above-described diisocyanate which have isocyanurate ring can be used.

The reason why alkylene diisocyanate, cycloalkylene diisocyanate and aralkylene diisocyanate are particularly preferred for the organic diisocyanate compound is that when aromatic diisocyanates, such as tolylene diisocyanate, diphenylmethane diisocyanate and naphthylene diisocyanate are used, the resulting resin composition tends to discolor upon baking. The resin composition has poor compatibility when used as a material for vinyl chloride sol; microgels tends to be formed since the aromatic diisocyanates have high reaction rate, and in addition, the resin composition has poor stability. Carbodiimidemodified diphenylmethane diisocyanate (liquid MDI) has the same disadvantages as the aromatic diisocyanates. However, a part, i.e., from 1 to 50% by weight, of the organic diisocyanate compound used in the present invention can be replaced by the aromatic diisocyanate or liquid MDI.

Preferred examples of the organic diisocyanates which can be used in the present invention include 1,6-hexamethylene diisocyanate, 1,3- or 1,4-bis-(isocyanatomethyl)cyclohexane, 3-isocyanatomethyl-3,5,5-trimethylcyclohexyl isocyanate (isophorone diisocyanate), dicyclohexylmethane-4,4'-diisocyanate, and xylylene diisocyanate, and mixtures thereof.

As stated above, polyisocyanate having an isocyanurate ring can be synthesized by reacting the diisocyanate compound selected from the group consisting of alkylene diisocyanate, cycloalkylene diisocyanate and aralkylene diisocyanate with each other in the presence of an isocyanuration catalyst. However, the present invention is not limited to the use of the polyisocyanate described above, but there can be used also polyisocyanate having an isocyanurate ring obtained by reacting the diisocyanate compound selected from the group consisting of alkylene diisocyanate, cycloalkylene diisocyanate and aralkylene diisocyanate and a diol having a molecular weight of from about 100 to about 1,000 and having at least three hydrocarbon residue per molecule as substituents in the presence of an isocyanuration catalyst. Alternatively, there can be used polyisocyanate which is obtained by reacting polyisocyanate derived from the diisocyanate selected from the group consisting of alkylene diisocyanate, cycloalkylene diisocyanate and aralkylene diisocyanate having an isocyanurate ring with a diol having a molecular weight of from about 100 to about 1,000 and having at least three hydrocarbon residue per molecule as substituents.

Examples of the diol having a molecular weight of from about 100 to about 1,000 and having at least three hydrocarbon residue per molecule as substituents include those diols disclosed in Japanese Patent Publication (Kokai) No. 60-181114, more particularly, 1,2,2-trimethyl1,3-propanediol (2,2-dimethyl-1,3-butanediol), 2,2-dimethyl-3-isopropyl-1,3-propanediol (2,2,4-trimethyl-1,3-pentanediol) and the like. In addition, there can also be used long chain alkyl diols, polyether diols, polyester diols, and polybutadiene glycol, and mixtures of two or more of these compounds.

Examples of the long chain alkyl diols include propylene glycol, 1,4-butanediol, 1,6-hexanediol, 1,9-nonanediol, dodecanediol, 12-hydroxystearyl alcohol, and polybutadiene glycol. Particularly preferred are diols having 8 or more carbon atoms.

Examples of the polyether diols include polypropylene glycol, polytetramethylene glycol, and polybutylene glycol. Among them, polytetramethylene glycol is preferred.

As for the polyester diols, there can be cited, for example, those obtained by the condensation polymerization of dicarboxylic acids and/or their anhydride, esters or halides with the above-described diols. Examples of the dicarboxylic acid include aliphatic dicarboxylic acids such as maleic acid, adipic acid, sebacic acid, and dimeric acid; aromatic dicarboxylic acids such as phthalic acid, isophthalic acid, and terephthalic acid; alicyclic dicarboxylic acids such as tetrahydrophthalic acid and hexahydrophthalic acid; and their anhydrides. Among them, preferred are aliphatic dicarboxylic acids having 4 or more carbon atoms. Also, polylactone polyols which can be obtained by subjecting lactones such as (-caprolactone and γ-butyrolactone to ring opening polymerization in the presence of the above-described diols.

Examples of the polybutadiene glycol include 1,2- or 1,4-type polybutadienes having a hydroxyl group at each terminal, e.g., "POLYBUTADIENE GLYCOL G-1000" manufactured by NIPPON SODA CO.LTD.

In the above-described manner, there can be obtained the polyisocyanate having an isocyanurate ring and containing as one of the essential components diisocyanate compound selected from the group consisting of alkylene diisocyanate, cycloalkylene diisocyanate and aralkylene diisocyanate.

After reacting the isocyanurate-type polyisocyanate with the active hydrogen-containing compound having one or two active hydrogen atoms (per molecule) which can react with the isocyanate group of the polyisocyanate, the product is blocked with a blocking agent explained later to give rise to the objective blocked urethane prepolymer (C).

The active hydrogen-containing compound is a kind of a modifier required for dissolving the blocked urethane prepolymer in the plasticizer (B). As for the active hydrogen-containing compound, there can be used, for example, alcohols, mercaptans, thiophenol, and amine compounds.

Any type of alcohols may be used and there is no limitation on the number of carbon atoms in the alcohols. However, taking into consideration their compatibility with the plasticizer (B), it is preferred to use alcohols having 4 or more carbon atoms per hydroxyl group. For example, there can be used alkyl alcohols such as monohydric alkyl alcohols, e.g., butyl alcohol, heptyl alcohol, hexyl alcohol, octyl alcohol, 2-ethylhexyl alcohol, isononyl alcohol, stearyl alcohol, and the like and their isomers of various classes; dihydric alkyl alcohols, e.g., 2,2,4-trimethyl-1,3-pentanediol, octanediol ("DIOL KYOWA 8" produced by KYOWA HAKKO CO., LTD.), 2.5 dimethyl-2,5-hexanediol, 1.9-nonanediol, decanediol, 1.12-dodecanediol, 12-hydroxystearyl alcohol, α-olefin glycol, and the like and their isomers; cycloalkyl alcohols such as monohydric cycloalkyl alcohols, e.g., cyclohexyl alcohol, methylcyclohexyl alcohol, ethylcyclohexyl alcohol, propylcyclohexyl alcohol, butylcyclohexyl alcohol, hydroxydicyclopentadiene ("CYDECANOL" produced by HITACHI CHEMICAL CO., LTD.), and the like and their isomers of various classes; dihydric cycloalkyl alcohols, e.g., cyclohexanedimethanol, hydrogenated bisphenol A, oleyl alcohol dimer, tricyclodecanedimethylol, and the like and their isomers; aralkyl alcohols such as monohydric aralkyl alcohols, e.g., benzyl alcohol, methylbenzyl alcohol, ethylbenzyl alcohol propylbenzyl alcohol, butylbenzyl alcohol, and the like and their isomers of various classes; dihydric aralkyl alcohols, e.g., xylylene dialcohol, styrene glycol, and the like and their isomers. In addition, there can also be used acetylene alcohols such as monohydric acetylene alcohols, e.g., 3-methyl-1-butyn-3-ol, 3-methyl-1-pentyn-3-ol, and the like dihydric acetylene alcohols, e.g., 3,6-dimethyl-4-octyn-3,6-diol, and the like; polymeric polyols such as polybutadiene glycol and the like; nitrogen-containing alcohols such as dimethylaminoethyl alcohol, diethylaminoethyl alcohol and the like; ester monoalcohols made from low molecular weight diol and monocarboxylic acid or hydroxycarboxylic acid and ester diols, e.g., "ESTER DIOL 204" produced by UNION CARBIDE CORP., and the like.

As the mercaptan or thiophenol, there can be cited, for example, mercaptans such as alkylmercaptans, cycloalkylmercaptans, and aralkylmercaptans, and thiophenol. There is no limitation on the number of carbon atoms contained in the mercaptan. However, taking into consideration their compatibility with the plasticizer (B), it is preferred to use mercaptans having 4 or more carbon atoms per thiol (SH) group. For example, there can be used octyl mercaptan, lauryl mercaptan, cyclohexyl mercaptan, benzyl mercaptan, thiophenol and the like.

In addition, amine compounds can also be used. The amine compounds do not form urethane bonds but react with isocyanates to form urea bonds. The amine compounds include primary amines and secondary amines. Taking into consideration the reaction rate and concentration of hydrogen bond due to urea bonds, secondary amines are preferred. Examples of them include dialkylamines such as dibutylamine, alkylarylamines such as N-methylaniline, aralkylamines such as dibenzylamine, methylbenzylamine and the like.

In the case of the amine compounds too, there is no limitation of the number of carbon atoms contained therein. However, taking into consideration compatibility with the plasticizer (B), it is preferred that the amine compounds have 4 or more carbon atoms per NH group.

The active hydrogen containing compounds can be used alone or two or more of them can be used in the form of a mixture. The number of the active hydrogen atoms per molecule ranges from 1 to 2. When this number is above 2, gelation tends to occur during the reaction.

The molecular weight of the active hydrogen-containing compound is from about 72 to 5,000, preferably up to 2,000. When the molecular weight is too high, the amount of the active hydrogen-containing compound for the amount of the polyisocyanate becomes too much, resulting in that although the solubility in the plasticizer increases, other characteristics such as adhesion strength are deteriorated.

The active hydrogen-containing compound is used usually in an amount of from about 1 to 50% by weight, preferably from 3 to 30% by weight, based on the weight of the polyisocyanate having an isocyanurate ring.

As for the blocking agent used for preparing the blocked urethane prepolymer, there can be cited, for example, active methylene compounds such as malonic acid diesters, e.g., diethyl malonate, acetoacetic acid ester, e.g., ethyl acetoacetate, acetylacetone, and the like; oxime compounds such as acetoxime, ketoxime, e.g., methyl ethyl ketoxime (butanone oxime), and the like; phenol compounds such as phenol, cresol and the like; lactam compounds such as ϵ-caprolactam and the like; imidazole compounds such as 2-methylimidazole and the like; monoamide compounds such as N-ethylacetamide, N-phenylacetamide and the like (Japanese Patent Publication (Kokai) No. 57-145161).

The blocking agent is not limited to a single compound but two or more compounds may be used in the form of a mixture. Among these, preference is made depending on the kind of the isocyanate, and the baking temperature at the time when the polyvinyl chloride resin composition is used. Generally, when the dissociation temperature and baking temperature of isocyanate are in the range of from 100° to 140° C., the active methylene compound and the oxime compound, particularly ethyl acetoacetate, methyl ethyl ketoxime and monoamide compound are preferred. The amount of the blocking agent to be used is not lower than 1 equivalent but below 1.5 equivalents, preferably from 1.0 to 1.2 equivalents, per equivalent of the remaining isocyanate group, which is difference between the equivalent of isocyanate group in the polyisocyanate and the equivalent of the active hydrogen-containing compound.

The temperature of reaction between the active hydrogen-containing compound and the blocking agent is usually in the range of from 40° to 140° C. Upon such reaction, known urethanation catalyst, e.g., organic tin compounds, tertiary amines, metal alcoholate and the like can be added to accelerate the reaction.

The reaction can usually proceed without solvents. However, in view of the efficiency of operation upon taking out the product, it is preferred to carry out the reaction in a solvent and/or diluent. A wide variety of solvents and diluents can be used for the purpose. Typical examples of them include the above-described plasticizers, acetic acid esters, e.g., ethyl acetate, butyl acetate and the like, ketones, e.g., methyl ethyl ketone (MEK), methyl isobutyl ketone (MIBK), cyclohexanone and the like, ethers, e.g., dibutyl ether and the like, aromatic solvents, e.g., xylene, toluene and the like. However, the present invention is not limited thereto.

The blocked urethane prepolymer thus obtained usually have a molecular weight of from 500 to 5,000, preferably from 600 to 3,000. When the molecular weight is below 500, the resin composition tends to become hard and brittle, thus decreasing its physical properties upon use as a material for vinyl chloride sol. On the other hand, when the molecular weight exceeds 5,000, adhesion strength of the resin composition decreases.

The polyvinyl resin composition of the present invention can be mixed with various additives such as stabilizers, fillers, lubricants, pigments, dissociation accelerators, diluents and the like.

As for the stabilizer, there can be cited, for example, metal soaps, e.g., potassium stearate, zinc stearate, aluminum stearate and the like, inorganic acid salts, e.g, dibasic phosphorous acid salt, dibasic sulfuric acid salt and the like, organic metal compounds, e.g., dibutyltin malate, dioctyltin malate, dioctyltin bis(2-ethylhexyl malate) and the like as organic tin stabilizer, epoxylated soybean oil or epoxy resin, and the like.

As for the filler, there can be cited, for example, inorganic fillers, e.g., hydrate silica, calcium carbonate, talc, diatomaceous earth, kaolin clay, sedimented barium sulfate and the like, and organic fillers such as thermoplastic resins, e.g., cellulose-, polyethylene terephthalate-, acrylic rubber- and urethane-based resins.

The lubricant includes various kinds of paraffins and waxes, fatty acid amides, fatty acid esters, fluorohydrocarbons, organic silicones as well as metal soaps.

The pigment may be of any type as far as it is suited for coloring. There can be used various pigments such as inorganic pigments, e.g., titanium oxide and red oxide, organic pigments, e.g., carbon black, phthalocyanin blue singly or in the form of a mixture.

In order to decrease the temperature or shorten the period of its heat treatment when in practical use by accelerating the reaction upon heating the polyvinyl chloride resin composition, conventional catalysts which are used usually for accelerating the dissociation of blocked urethane prepolymer, can be used in combination. For the purpose, there can be used organic metal compounds such as zinc octanoate, tin octanoate, dibutyltin dilaurate, and dibutyltin acetate, bases such as triethylenediamine, triethylamine, and 1,8-diazabicycloundecene-7, and the like.

As for the diluent, there can be used, for example, aliphatic solvents having a boiling point of from 70° to 240° C. (1 atm) such as paraffin series hydrocarbon solvents having 6 or more carbon atoms, e.g., hexane, heptane, octane, nonane, decane, etc., naphthene series hydrocarbon solvents, e.g., cyclohexane, methylcyclohexane, dimethylcyclohexane, diethylcyclohexane, trimethylcyclohexane, etc., and mixtures of these solvents, aromatic series solvents, e.g., toluene, xylene, ethylbenzene, mistylene, "SOLVESSO #100" and "SOLVESSO #150", each produced by EXXON CHEMICALS. Also, mineral spirit, which is a mixture of an aliphatic solvent and an aromatic solvent, e.g., "LAWS" and "HAWS", each produced by SHELL INTERNATIONAL RESEARCH MARCHAPY, N.V. can be used. Furthermore, a portion of the solvent may be replaced by a solvent having an extremely high boiling point, for example, "SAS-296" and "SAS-LH" each produced by NIPPON PETROCHEMICALS CO., LTD., which are liquid high boiling point aromatic hydrocarbons, and dimeric acid, and the like.

In the polyvinyl chloride resin composition of the present invention, the components (A), (B) and (C) are present in the following proportions.

|  | General Range | Preferred Range |
| --- | --- | --- |
| Component (A) | 10–50% by weight | 20–40% by weight |
| Component (B) | 10–50% by weight | 20–40% by weight |
| Component (C) | 1–10% by weight | 2–7% by weight |
| Additives* | 0–70% by weight | 0–60% by weight |

Note:
Additives include filler and pigment

When the stabilizer is used as the additive, it is used usually in an amount of from 0 to 5% by weight, preferably from 0.1 to 3% by weight. In the case of the diluent, it is used in an amount of usually from 0 to 7% by weight, preferably form 1 to 5% by weight. The dissociation accelerator is used in an amount of usually from 0 to 1% by weight, preferably from 0 to 0.3% by weight.

The polyvinyl chloride resin composition of the present invention can be prepared by kneading the components in conventional manner.

The resin composition of the present invention can be applied to various metal surfaces and various coated surfaces formed on the surfaces of metals, particularly steel material. It can be applied advantageously onto the surfaces of cation-type electrodeposited coating, acrylic resin coating, and metals. The cation-type electrodeposition coating is a coating method in which film forming component is present as a cathode and a material to be coated (steel plate or the like) serves as an anode and direct current is applied to deposit the coating material on the surface of the material to be coated when polyamine resin, for example, is used as the coating material, which is an aqueous solution or dispersion prepared by neutralizing with a lower organic acid a film forming component composed of an epoxy resin having amino groups in the molecule and blocked isocyanate which can react with amino groups or hydroxyl groups in the epoxy resin. As for the acrylic resin coating material for use in the acrylic resin coating, there can be used thermoplastic type ones and thermosetting type ones. The thermoplastic type acrylic resin coating is prepared using acrylic (co)polymer together with cellulose derivative (e.g., cellulose nitrate, cellulose acetate butyrate, etc.), and plasticizer, and is intended to be dried mainly at ambient temperature. On the other hand, the thermosetting type acrylic resin coating material is composed of acrylic (co)polymer which has one or more functional groups in the molecule and is designed to form crosslinked coating film when heated alone or heated during reaction with a crosslinking agent.

The polyvinyl chloride resin composition of the present invention is coated on the above-described surfaces to be coated in an amount of usually from 150 to 3,000 g/m$^2$. The thickness of coating film is usually from 0.15 to 3 mm. Generally, baking is performed after coating. The baking temperature is usually from 110° to 150° C. and the baking time is usually for from 20 to 40 minutes. For coating, conventional methods can be used. For example, spray coating, brush coating, dipping, casting, pouring, airless spraying, etc. can be used. In addition, electrostatic coating, solid coating and the like can also be used as general method for coating the polyvinyl chloride resin composition of the present invention.

The polyvinyl chloride resin composition of the present invention can bond strongly to many substrates, for example, cation electrodeposition coated surface, acrylic coating surface, metal surface by baking under the conditions of low temperature and short period of time (at from 120° to 130° C. for from 20 to 30 minutes) and does not discolor. Furthermore, it exhibits excellent stability and there is little increase in its viscosity even under severe conditions of 45° C. for 3 weeks.

The polyvinyl chloride resin composition of the present invention can be put to various industrial applications, for example, as baking type coating material, adhesive, sealant, caulking material and the like. It is particularly advantageous as paint for cars, in particular body sealer or undercoat paint for the body of car which body is coated with various coating materials as undercoats or without such undercoats.

Hereinafter, the present invention will be described in greater detail with reference to examples, comparative examples and reference examples. However, the invention should not be construed as being limited thereto.

REFERENCE EXAMPLE 1

Synthesis Example of Isocyanurate-Type Polyisocyanate of Hexamethylene Diisocyanate In a 2 liter four-necked glass flask equipped with a stirrer, a pipe for introducing nitrogen gas, an air cooling pipe and a thermometer was charged 1,400 g of hexamethylene diisocyanate (abbrev.; HMDI, molecular weight: 168.2) in nitrogen gas stream. The flask was set in an oil bath and the temperature was elevated to 55° C. while stirring and kept at this temperature for 1 hour. Then, 3.9 g (2.39 mmol) of 16% butylcellosolve solution of β-methylcholine octoate (abbrev.; CO, molecular weight: 261.4) was added as an isocyanuration catalyst and reaction was allowed to proceed. As soon as the reaction was initiated, generation of heat was observed, and the temperature of the inside the reactor reached up to 62° C. After generation of heat stopped, the temperature of the inside the reactor was kept at 60° C. and subsequently the reaction was continued for 4.5 hours in total. Thereafter, 3.9 g (2.39 mmol) of 5.8% xylene solution of monochloroacetic acid (molecular weight: 94.5) was added in the reactor as deactivator for the catalyst to conclude the reaction.

After cooling the reaction mixture down to room temperature, a portion (1,000 g) thereof was subjected to molecular distillation to obtain 338 g of polyisocyanate (conversion: 33.8%) and 662 g of distillate ((recovery: 66.2%). The polyisocyanate thus obtained was a liquid substance which was fluid at room temperature. When diluted with ethyl acetate to a concentration nonvolatile content to 75.0%, it showed Gardner color index of 1 or less, and Gardner viscosity of $A_2$14 $A_1$. The isocyanate content of the product was 16.4%, and it was confirmed that it contained isocyanurate ring. Its molecular weight was 619. On the other hand, analysis of the distillate upon molecular distillation confirmed that it was substantially pure HMDI.

REFERENCE EXAMPLE 2

Synthesis Example of Isocyanurate-Type Polyisocyanate of 1,3-Bis(isocyanatomethyl)cyclohexane In analogous manner as in Reference Example 1, 1,400 g of 1,3-bis(isocyanatomethyl)cyclohexane (abbrev.:H$_6$XDI, molecular weight: 194.2) was reacted using 5.5 g (3,37 mmol) of 16% CO butylcellosolve solution as isocyanuration catalyst. After the predetermined reaction time, 5.5 g (3.37 mmol) of 5.8% xylene solution of monochloroacetic acid was added in the reactor as deactivator for the catalyst to conclude the reaction.

As the result of molecular distillation, conversion was 37.8%. When diluted with ethyl acetate to a concentration nonvolatile content to 75.0%, the isocyanurate-type polyisocyanate thus obtained had the following properties and the results of the analysis there of were as follows. That is, it showed Gardner color index of 1 or less, and Gardner viscosity of $I^2$-J. The isocyanate content of the product was 14.9%. Its molecular weight was 637. On the other hand, analysis of the distillate upon molecular distillation confirmed that it was substantially pure HMDI.

REFERENCE EXAMPLE 3

Synthesis Example of Isocyanurate-Type Polyisocyanate of a Mixture of HMDI and $H_6XDI$ In analogous manner as in Reference Example 1, 980 g of HMDI and 420 g of $H_6XDI$ were reacted using 4.5 g (2.75 mmol) of 16% CO butylcellosolve solution as isocyanuration catalyst. After the predetermined reaction time, 4.5 g (2.75 mmol) of 5.8% xylene solution of monochloroacetic acid was added in the reactor as deactivator for the catalyst to conclude the reaction.

As the result of molecular distillation of a portion (1,000 g) of the reaction mixture, conversion was 43.1%. When diluted with ethyl acetate to a concentration nonvolatile content to 75.0%, the isocyanurate-type polyisocyanate thus obtained had the following properties and the results of the analysis there of were as follows. That is, it showed Gardner color index of 1 or less, and Gardner viscosity of A - B. The isocyanate content of the product was 15.5%. Its molecular weight was 637. On the other hand, analysis of the distillate upon molecular distillation showed that it was substantially a mixture of $HMDI/H_6XDI = 7/3$.

REFERENCE EXAMPLE 4

Synthesis Example of Isocyanurate-Type Polyisocyanate of a Mixture of HMDI and Xylylene Diisocyanate In analogous manner as in Reference Example 1, 1,316 g of HMDI and 84 g of xylylene diisocyanate (abbrev.; XDI, molecular weight: 188.2) were reacted using 4.8 g of 16% CO butylcellosolve solution as isocyanuration catalyst. After the predetermined reaction time, 4.8 g of 5.8% xylene solution of monochloroacetic acid was added in the reactor as deactivator for the catalyst to conclude the reaction.

As the result of molecular distillation of a portion (1,000 g) of the reaction mixture, conversion was 33.2%. When diluted with ethyl acetate to a concentration nonvolatile content to 75.0%, the isocyanurate-type polyisocyanate thus obtained had the following properties and the results of the analysis there of were as follows. That is, it showed Gardner color index of 1 or less, and Gardner viscosity of B - C. The isocyanate content of the product was 15.1%. Its molecular weight was 697. On the other hand, analysis of the distillate upon molecular distillation showed that it was substantially pure HMDI.

REFERENCE EXAMPLE 5

Synthesis Example of Isocyanurate-Type Polyisocyanate of 2,2,4-Methyl-1,3-Pentanediol-Modified HMDI In analogous manner as in Reference Example 1, were charged 1,400 g (8.32 mol) of HMDI and 50 g (0.34 mol) of 2,2,4-methyl-1,3-pentanediol (abbrev.; TMPD, molecular weight: 146.2) in the flask. The flask was set in an oil bath and the temperature was elevated to 55° C. while stirring and kept at this temperature for 1 hour. Then, 16% butylcellosolve solution of CO as an isocyanuration catalyst was added in the reactor portion-wise. At point in time when the catalyst solution was added in a total amount of 2.4 g (1.47 mmol), the reaction was initiated and generation of heat was observed. The temperature of the inside the reactor reached up to 62° C. After generation of heat stopped, the temperature of the inside the reactor was kept at 60° C. and subsequently the reaction was continued for 4.5 hours in total. Thereafter, 2.4 g (1.47 mmol) of 5.8% xylene solution of monochloroacetic acid (molecular weight: 94.5) was added in the reactor as deactivator for the catalyst to conclude the reaction.

After cooling the reaction mixture down to room temperature, a portion (1,000 g) thereof was subjected to molecular distillation to obtain 331.3 g of polyisocyanate (conversion: 33.2%) and 666.7 g of distillate (recovery: 66.8%). The polyisocyanate thus obtained was a liquid substance which was fluid at room temperature. When diluted with ethyl acetate to a concentration nonvolatile content to 75.0%, it showed Gardner color index of 1 or less, and Gardner viscosity of $A_1$ - A. The isocyanate content of the product was 15.0%, and it was confirmed that it contained isocyanurate ring. Its molecular weight was 654. On the other hand, analysis of the distillate upon molecular distillation confirmed that it was substantially pure HMDI.

REFERENCE EXAMPLE 6 TO 15

Preparation of Blocked Urethane Prepolymer of Isocyanurate-Type Polyisocyanate

In 2 liter four-necked flasks each equipped with a stirrer, a thermometer, a pipe for introducing nitrogen gas and a Liebig cooling pipe were charged the isocyanurate-type polyisocyanates obtained in Reference Examples 1 to 5, an active hydrogen-containing compound and dioctyl phthalate as a diluent according to the recipe shown in Table 1, and allowed to react at 80° C. for 1 hour while stirring. Then, a blocking agent was added gradually according to the recipe shown in Table 1 and the reaction was continued at 90° C. for about 1 hour. Complete extinction of the absorption by isocyanate group (2,250 cm$^{-1}$) was confirmed by infrared absorption spectral analysis, or it was confirmed that the content of isocyanate was 0%. If the blocking was incomplete, an appropriate amount of the blocking agent was added and the reaction was continued to complete blocking. Thus, there were obtained dioctyl phthalate solutions of blocked urethane prepolymers of isocyanurate-type polyisocyanates soluble in a plasticizer which is liquid at room temperature.

REFERENCE EXAMPLE 16

Preparation of Blocked Urethane Prepolymer of Comparative Isocyanurate-Type Polyisocyanate (1) In 2 liter four-necked flasks each equipped with a stirrer, a thermometer, a pipe for introducing nitrogen gas and a Liebig cooling pipe were charged HMDI as an organic diisocyanate and ethyl acetate as a solvent, and the mixture was heated to 70° C. in nitrogen gas stream while stirring. The trimethylolpropane in a proportion of 1 mole for 3 moles of the organic diisocyanate was added dividedly and successively. After reacting for about 3 hours, adduct-type polyisocyanate was obtained which had an active isocyanate content of 12% and Gardner viscosity of M - N.

(2) The adduct-type polyisocyanate obtained in (1) above was charged according to the recipe in Table 1 in a reactor similar to that used in Reference Examples 6 to 15. Also, an active hydrogen-containing compound and ethyl acetate were charged according to the recipe shown in Table 1, and allowed to react at 70° C. for 1 hour while stirring. Then, a blocking agent was added gradually according to the recipe shown in Table 1 and the reaction was continued at 70° C. for about 1 hour to obtain a blocked urethane prepolymer of an adduct-type polyisocyanate which was liquid at room temperature and whose isocyanate content was 0%.

REFERENCE EXAMPLE 17

Preparation of Blocked Urethane Prepolymer of Comparative Isocyanurate-Type Polyisocyanate In order to prepare blocked isocyanate of a type which is blocked with a blocking agent alone without using active hydrogen-containing compounds and in which isocyanurate ring is contained in the main chain of the molecule (endoisocyanurate ring type), the isocyanurate-type polyisocyanate obtained in Reference Example 1 was charged according to Table 1 in a reactor similar to that used in Reference Example 1. Then, dioctyl phthalate (DOP) as a plasticizer and a blocking agent were added and the mixture was reacted at 90° C. for about 1 hour. The blocked urethane prepolymer thus obtained was liquid at room temperature but was turbid.

REFERENCE EXAMPLE 18

Preparation of Blocked Urethane Prepolymer of Comparative Isocyanurate-Type Polyisocyanate Similarly to Reference Example 17, there was prepared blocked aromatic isocyanurate of endo-isocyanurate ring type blocked with a blocking agent alone without using active hydrogen-containing compounds. In analogous apparatus as used in Reference Example 17 was charged "BURNOCK D-802" produced by DAI-NIPPON INK AND CHEMICALS, INC, which is commercially 50% butyl acetate solution of tolylene diisocyanate polymer according to the recipe shown in Table 1. Then, dioctyl phthalate (DBP) as a plasticizer and a blocking agent were charged. The mixture was reacted at 90° C. for about 1 hour. After confirming complete extinction of the absorption by isocyanate group (2,250 cm$^{-1}$) by infrared absorption spectral analysis, or the content of isocyanate being 0%, the pipe for introducing nitrogen gas and Liebig cooling pipe were moved with the stirrer and the thermometer being left as they are in order to enable performing distillation of butyl acetate under reduced pressure using a vacuum pump, more particularly, under the conditions of 90° C. and 60 mmHg. After distilling off butyl acetate, blocked urethane prepolymer was obtained which was liquid at room temperature but was slightly turbid.

The results of reference examples for the preparation of various blocked urethane prepolymers are summarized in Table 1 below.

TABLE 1

| | REFERENCE EXAMPLE | | | | | | | | | | | | |
|---|---|---|---|---|---|---|---|---|---|---|---|---|---|
| | 6 | 7 | 8 | 9 | 10 | 11 | 12 | 13 | 14 | 15 | 16 | 17 | 18 |
| Starting Material Diisocyanate | | | | | | | | | | | | | |
| HMDI (mol) | 2.0 | — | 1.79 | 1.86 | 1.76 | 2.0 | 2.0 | 2.0 | 2.0 | 2.0 | 3.0 | 2.0 | — |
| XDI (mol) | — | 1.95 | 0.67 | — | — | — | — | — | — | — | — | — | — |
| XDI (mol) | — | — | — | 0.11 | — | — | — | — | — | — | — | — | — |
| TDI (mol) | — | — | — | — | — | — | — | — | — | — | — | — | 2.0 |
| Modified Polyol | | | | | | | | | | | | | |
| TMPD (mol) | — | — | — | — | 0.23 | — | — | — | — | — | — | — | — |
| TMP (mol) | — | — | — | — | — | — | — | — | — | — | 1.0 | — | — |
| Reference Example for preparation of IC-PIC | 1 | 2 | 3 | 4 | 5 | 1 | 1 | 1 | 1 | 1 | — | — | — |
| Type of PIC | a | a | a | a | a | a | a | a | a | a | b | a | a |
| Active Isocyanate Content[1] (%) | 16.4 | 14.9 | 15.5 | 15.1 | 15.0 | 16.4 | 16.4 | 16.4 | 16.4 | 16.4 | 12.0 | 16.4 | 11.4 |
| Equivalent of Polyisocyanate NCO | 192 | 221.4 | 203.2 | 208.6 | 210 | 192 | 192 | 192 | 192 | 192 | 262.5 | 192 | 276 |
| Amount of PIC (parts) | 500 | 500 | 500 | 500 | 500 | 500 | 500 | 500 | 500 | 500 | 666[2] | 500 | 500[3] |
| Kind and Amount of AHCC (parts) | | | | | | | | | | | | | |
| tert.-Butanol | 33 | 30 | 26 | 34 | 34 | — | — | 33 | 33 | 33 | 22 | — | — |
| 2-Ethylhexyl Alcohol | — | — | — | — | — | 58 | — | — | — | — | — | — | — |
| Dibutylamine | — | — | — | — | — | — | 58 | — | — | — | — | — | — |
| Kind and Amount of Blocking Agent (parts) | | | | | | | | | | | | | |
| MEK Oxime | 194 | 173 | 192 | 171 | 171 | 194 | 194 | — | — | — | 192 | 232 | — |
| Ethyl Acetoacetate | — | — | — | — | — | — | — | 289 | — | — | — | — | — |
| Acetanilide | — | — | — | — | — | — | — | — | 300 | — | — | — | — |

TABLE 1-continued

| | REFERENCE EXAMPLE | | | | | | | | | | | | |
|---|---|---|---|---|---|---|---|---|---|---|---|---|---|
| | 6 | 7 | 8 | 9 | 10 | 11 | 12 | 13 | 14 | 15 | 16 | 17 | 18 |
| Xylenol | — | — | — | — | — | — | — | — | — | 271 | — | — | — |
| p-Oxybenzoic Acid-2-ethyl-hexyl | — | — | — | — | — | — | — | — | — | — | — | — | 227 |
| Kind and Amount of Diluent (parts) | | | | | | | | | | | | | |
| DOP | 485 | 469 | 479 | 470 | 470 | 501 | 501 | 548 | 555 | 536 | — | 488 | — |
| DBP | — | — | — | — | — | — | — | — | — | — | — | — | 968 |
| Ethyl Acetate | — | — | — | — | — | — | — | — | — | — | 310 | — | — |
| Properties of Blocked Urethane Prepolymer | | | | | | | | | | | | | |
| Appearance | A | A | A | A | A | A | A | A | A | A | A | C | B |
| Amount of Active Ingredient (%) | 60 | 60 | 60 | 60 | 60 | 60 | 60 | 60 | 60 | 60 | 60 | 60 | 60 |

Notes:
"IC" stands for "isocyanurate type".
"PIC" stands for "polyisocyanate".
"AHCC" indicates "active hydrogen-containing compound".
Symbols "a" and "b" indicate "endo-isocyanurate ring-type" and "adduct-type", respectively.
Symbols "A", "B" and "C" stand for "transparent", "slightly turbid" and "turbid", respectively.
Mole number of the starting material was described only for those which participated in the reaction.
[1] Active isocyanate content (nonvolatile portion: 75%)
[2] Ethyl acetate solution (nonvolatile portion: 75%)
[3] Butyl acetate solution (nonvolatile portion: 50%), with butyl acetate being distilled off under reduced pressure

REFERENCE EXAMPLES 19 TO 25

In analogous manner as in Reference Example 6 except that various active hydrogen-containing compounds were added to the isocyanurate-type polyisocyanate used in Reference Example 6, blocked urethane prepolymers of isocyanurate-type polyisocyanates were prepared, and solubility of the products in plasticizers were tested. The results obtained are shown in Table 2.

TABLE 2

| | REFERENCE EXAMPLE | | | | | | |
|---|---|---|---|---|---|---|---|
| | 19 | 20 | 21 | 22 | 23 | 24 | 25 |
| Starting Material Diisocyanate | | | | | | | |
| HMDI (mol) | 2.0 | 2.0 | 2.0 | 2.0 | 2.0 | 2.0 | 2.0 |
| Type of PIC | a | a | a | a | a | a | a |
| Active Isocyanate Content[1] (%) | 16.4 | 16.4 | 16.4 | 16.4 | 16.4 | 16.4 | 16.4 |
| Equivalent of Polyisocyanate NCO | 192 | 192 | 192 | 192 | 192 | 192 | 192 |
| Amount of PIC (parts) | 500 | 500 | 500 | 500 | 500 | 500 | 500 |
| Kind and Amount of AHCC (parts) | | | | | | | |
| Isononyl Alcohol | 64 | — | — | — | — | — | — |
| Oleyl Alcohol | — | 119 | — | — | — | — | — |
| Stearyl Alcohol | — | — | 120 | — | — | — | — |
| 2-Ethylhexan-1,3-diol | — | — | — | 50 | — | — | — |
| Oleyl Alcohol Dimer | — | — | — | — | 50 | — | — |
| Kind and Amount of AHCC (parts) | | | | | | | |
| Stearyl Alcohol | — | — | — | — | — | — | — |
| Polypropylene Glycol 1000 | — | — | — | — | — | — | — |
| Lauryl mercaptan | — | — | — | — | — | — | — |
| Kind and Amount of Blocking Agent (parts) | | | | | | | |
| MEK Oxime | 194 | 194 | 194 | 173 | 222 | 225 | 212 |
| Kind and Amount of Diluent (parts) | | | | | | | |
| DOP | 505 | 542 | 543 | 482 | 515 | 517 | 508 |
| Properties of Blocked Urethane Prepolymer | | | | | | | |
| Appearance | A | A | A | A | A | A | A |
| Amount of Active Ingredient (%) | 60 | 60 | 60 | 60 | 60 | 60 | 60 |

Note:
Same symbols denote same meaning as in the notes for Table 1.

EXAMPLES 1 TO 10 AND COMPARATIVE EXAMPLES 1 TO 3

Plastisol composition was prepared as follows. That is, polyvinyl chloride paste (in total 303 parts) composed of 70 parts of "KANE VINYL PSL-10" (vinyl chloride straight resin produced by KANEGAFUCHI CHEMICAL INDUSTRY CO., LTD.), 30 parts of "KANE VINYL PCH-12" (vinyl chloride copolymer resin), 100 parts of dioctyl phthalate (DOP), 100 parts of calcium carbonate and 3 parts of lead dibasic phosphite (DIPHOS) and 10 parts each of the blocked urethane prepolymer of the invention obtained in Reference Example 6 to 15 were kneaded homogeneously in a mixing and grinding machine to prepare compositions shown in Table 3 below.

Compositions of the comparative examples were prepared by using the same polyvinyl chloride paste as above together with the adduct-type blocked urethane prepolymer with an active hydrogen-containing compound (Reference Example 16) and isocyanurate-type blocked urethane prepolymers without active hydrogen-containing compounds (Reference Examples 17 and 18) as adhesiveness imparting agent.

Using the polyvinyl chloride resin compositions obtained in Examples 1 to 10 and Comparative Examples 1 to 3, degree of change in the viscosity when stored at a predetermined temperature was tested. Then, the polyvinyl chloride resin composition was coated on a steel plate, a steel plate coated with an acrylic coating material, a steel plate subjected to cation-type electrodeposition coating (cation ED plate) to a film thickness of 0.25 mm, and baked at 140° C. for 20 minutes. Adhesion strength to the substrates and discoloration resistance of the coating were tested. In addition, the strength of adhesion of the polyvinyl chloride resin composition to the cation electrodeposited plate was measured using a universal tension machine according to surface tension method similar to the standard for special plywood or ply metal (JAS). The results obtained are shown in Table 3.

From the results shown in Table 3, it can be seen that the resin composition according to the examples have a stability superior to that of the resin composition of the comparative examples and also exhibit excellent adhesion strength and discoloration resistance.

TABLE 3

| | EXAMPLE | | | | | | | | | | COMPARATIVE EXAMPLE | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Starting Material | | | | | | | | | | | | | |
| Polyvinyl Chloride Paste (parts) | 303 | 303 | 303 | 303 | 303 | 303 | 303 | 303 | 303 | 303 | 303 | 303 | 303 |
| Blocked Urethane Prepolymer (parts) | 10 | 10 | 10 | 10 | 10 | 10 | 10 | 10 | 10 | 10 | 10 | 10 | 10 |
| Reference Example for preparation of IC-PIC | 6 | 7 | 8 | 9 | 10 | 11 | 12 | 13 | 14 | 15 | 16 | 17 | 18 |
| Viscosity (poises, 25° C.) | | | | | | | | | | | | | |
| Immediately after preparation | 26.6 | 26.7 | 26.0 | 26.5 | 25.0 | 25.5 | 26.0 | 24.0 | 27.0 | 27.0 | 34.0 | 38.5 | 27.5 |
| 40° C. × 10 days | 27.6 | 28.0 | 27.4 | 28.0 | 25.8 | 26.3 | 27.0 | 26.0 | 28.5 | 28.0 | 50.0 | 57.0 | 33.2 |
| 40° C. × 20 days | 29.6 | 29.5 | 28.7 | 29.4 | 27.0 | 27.5 | 30.1 | 29.0 | 29.7 | 29.3 | 70.0 | 88.6 | 42.0 |
| Viscosity Increase Ratio[1] | 11.3 | 10.5 | 10.4 | 10.9 | 8.0 | 7.8 | 15.8 | 20.8 | 10.0 | 8.5 | 105.9 | 130.1 | 52.7 |
| Adhesion Strength | | | | | | | | | | | | | |
| Steel Plate After Baking | Good | Good | Good | Good | Good | Good | Good | Good | Good | Good | Bad | Bad | Poor |
| Acrylic Coating After Baking | Good | Good | Good | Good | Good | Good | Good | Fair | Good | Fair | Bad | Bad | Fair or Poor |
| Cation ED Plate After Baking | Good | Good | Good | Good | Good | Good | Good | Good | Good | Good | Bad | Bad | Fair |
| Discoloration Resistance[2] | | | | | | | | | | | | | |
| Cation ED Plate After Baking | Good | Good | Good | Good | Good | Good | Good | Good | Good | Good | Fair | Good | Bad |
| Plane Tensile Strength (kg/cm$^2$) | 9 | 8.5 | 8.4 | 9 | 8.5 | 8.0 | 8.5 | 8.0 | 9.5 | 8.5 | 2.0 | 2.5 | 7.4 |

Notes:

[1] Viscosity Increase Ratio: Ratio of difference of viscosity $V_2$ after heat acceleration minus initial viscosity $V_1$ divided by initial viscosity $V_1$ $$\frac{V_2 - V_1}{V_1} \times 100 \, (\%)$$

[2] Discoloration Resistance: Resin composition was coated on a cation ED plate and the coated plate was baked. Degree of discoloration was judged with eye.

What is claimed is:

1. A polyvinyl chloride resin composition comprising (A) a vinyl chloride homo- or copolymer, (B) a plasticizer and (C) a blocked isocyanate prepolymer, wherein the isocyanate prepolymer is an isocyanurate polyisocyanate prepared from an alkylene or aralkylene diisocyanate and reacted with an active hydrogen-containing compound selected from the group consisting of a mercaptan, an alcohol, a thiophenol and an amine.

2. A resin composition according to claim 1, wherein the alkylene diisocyanate is selected from the group consisting of 1-methyl-2,4-diisocyanatocyclohexane, 1,3-bis(isocyanatomethyl)cyclohexane; 1,4-bis-(isocyanatomethyl)cyclohexane; 3-isocyanatomethyl-3,5,5-trimethylcyclohexyl isocyanate and dicyclohexylmethane-4,4'-diisocyanate.

3. A resin composition according to claim 1, wherein the aralkylene diisocyanate is selected from the group consisting of xylylene diisocyanate; $\omega,\omega'$-diisocyanato-1,4-diethylbenzene; tetramethylxylylene diisocyanate, tolylene diisocyanate and naphthylene diisocyanate.

4. A resin composition according to claim 1, wherein the isocyanate prepolymer is blocked with a blocking agent selected from the group consisting of an active methylene compound, an oxime, a phenol, a lactam, an imidazole and a monoamide.

5. A resin composition according to claim 1, wherein the isocyanurate polyisocyanate reacted with the active hydrogen compound is reacted with a blocking agent selected from the group consisting of an active methylene compound, an oxime, a phenol, a lactam an imidazole and a monoamide.

6. A polyvinyl chloride resin composition as claimed in claim 1, wherein said active hydrogen-containing compound is an alcohol.

7. A polyvinyl chloride resin composition as claimed in claim 5, wherein said active hydrogen-containing compound is an alcohol.

8. A polyvinyl chloride resin composition as claimed in claim 1, wherein said active hydrogen-containing compound is a mercaptan.

9. A polyvinyl chloride resin composition as claimed in claim 5, wherein said active hydrogen-containing compound is a mercaptan.

10. A polyvinyl chloride resin composition as claimed in claim 1, wherein said active hydrogen-containing compound is a thiophenol.

11. A polyvinyl chloride resin composition as claimed in claim 5, wherein said active hydrogen-containing compound is a thiophenol.

12. A polyvinyl chloride resin composition as claimed in claim 1, wherein said active hydrogen-containing compound is an amine compound.

13. A polyvinyl chloride resin composition as claimed in claim 5, wherein said active hydrogen-containing compound is an amine compound.

* * * * *